(12) United States Patent
Tran et al.

(10) Patent No.: US 8,955,685 B2
(45) Date of Patent: Feb. 17, 2015

(54) GLYCERIDES AND FATTY ACID MIXTURES AND METHODS OF USING SAME

(75) Inventors: Bo L. Tran, Chicago, IL (US); Kerem Eraydin, Blacksburg, VA (US)

(73) Assignee: Nalco Company, Naperville, IL (US)

( * ) Notice: Subject to any disclaimer, the term of this patent is extended or adjusted under 35 U.S.C. 154(b) by 1050 days.

(21) Appl. No.: 12/982,217

(22) Filed: Dec. 30, 2010

(65) Prior Publication Data

US 2012/0168387 A1  Jul. 5, 2012

(51) Int. Cl.
   *B03D 1/008* (2006.01)
   *B03D 1/02* (2006.01)
   *C12F 3/10* (2006.01)

(52) U.S. Cl.
   CPC .......... *B03D 1/008* (2013.01); *B03D 2203/08* (2013.01); *B03D 1/02* (2013.01); *B03D 2201/02* (2013.01); *C12F 3/10* (2013.01)
   USPC ....................................... 209/166

(58) Field of Classification Search
   USPC ....................................... 209/166
   See application file for complete search history.

(56) References Cited

U.S. PATENT DOCUMENTS

| | | | |
|---|---|---|---|
| 2,014,406 A * | 9/1935 | Weed et al. ............ 209/166 |
| 7,398,935 B2 | 7/2008 | Tran | |
| 7,497,955 B2 | 3/2009 | Scheimann | |
| 7,566,469 B2 | 7/2009 | Scheimann | |
| 7,624,878 B2 | 12/2009 | Tran | |
| 7,837,891 B2 | 11/2010 | Tran | |
| 2006/0037890 A1 * | 2/2006 | Rautiola .............. 209/166 |
| 2007/0187300 A1 | 8/2007 | Tran | |
| 2007/0187301 A1 * | 8/2007 | Tran et al. ............ 209/166 |
| 2008/0005956 A1 | 1/2008 | Tran | |
| 2008/0115409 A1 | 5/2008 | Tran | |
| 2008/0190160 A1 | 8/2008 | Tran | |
| 2009/0008301 A1 | 1/2009 | Yoon | |
| 2010/0252487 A1 | 10/2010 | Tran | |
| 2011/0198296 A1 | 8/2011 | Child | |

OTHER PUBLICATIONS

Moreau, Robert et al. "The Composition of Crude Corn Oil Recovered after Fermentation via Centrifugation from a Commercial Dry Grind Ethanol Process," Journal of the American Oil Chemists Society, vol. 87, No. 8 (2010), pp. 895-902.

* cited by examiner

*Primary Examiner* — Thomas M Lithgow
(74) *Attorney, Agent, or Firm* — Benjamin E. Carlsen

(57) ABSTRACT

Green compositions and technologies are provided. In an embodiment, the present invention provides a method of separating a first material from a second material. For example, the method can comprise mixing the first material and the second material in a slurry with a beneficiation composition. The beneficiation composition can comprise one or more glyceride and fatty acid mixtures extracted from an ethanol process. Air bubbles can be provided in the slurry to form bubble-particle aggregates with the first material and the bubble-particle aggregates can be allowed to be separated from the second material.

9 Claims, No Drawings

GLYCERIDES AND FATTY ACID MIXTURES AND METHODS OF USING SAME

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates generally to methods and compositions useful in green technologies. More specifically, the present invention relates to glycerides and fatty acid mixtures derived from ethanol processes as co-products or by-products. These mixtures can be applied in numerous applications. One application is beneficiation, a method of separating useful matter from waste. Another application is dewatering, separating water from a material. Other applications are selected from a list comprising of lubrication fluid, rolling oil, hydraulic fluids, antifoams, defoamers, drilling fluid, coating oil, fire-resistance fluid, bulk density control, coal bulk density control, and dust control.

As described for example in U.S. Pat. Nos. 7,624,878 and 7,837,891 B2, and U.S. patent application Ser. No. 12/706, 091, beneficiation uses the difference in the hydrophobicity of the respective components. During this process, the mineral ore is comminuted to a certain small size and slurried with water. The slurry is introduced into a flotation apparatus purged with air. The air preferentially attaches to the hydrophobic particles of the slurry, making them float to the top of the apparatus. The floated particles are collected, dewatered, and accumulated as a sellable final product. The hydrophilic particles tend to migrate to the bottom of the contact vessel from where they can be removed as tailings and processed into waste impoundments. In other processes, such as reverse flotation, the sellable final product may migrate to the bottom.

To facilitate beneficiation, several types of conventional reagents are used such as frothers, collectors, promoters and conditioners. Nevertheless, these reagents can be expensive and toxic thereby reducing the cost-effectiveness of the beneficiation processes. Diesel fuel, a petroleum-based fuel such as kerosene or #2 fuel oil, is a common beneficiation composition; it is toxic and is derived from non-renewable resource. Contrarily, the present invention is non-hazardous and is derived from renewable resources; it can be used to replace diesel fuel.

It is therefore novel, useful and non-obvious desirable to provide and utilize cost-effective, non-hazardous, and effective beneficiation compositions. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed to a method of separating a first material from a second material. The method comprises the steps of: (1) mixing the first material and the second material in a slurry with a beneficiation composition, (2) providing air bubbles in the slurry to form bubble-particle aggregates with the first material, and (3) allowing the bubble-particle aggregates to be separated from the second material. The beneficiation composition comprises at least one glyceride and fatty acid mixtures extracted from an ethanol process, The glycerides and fatty acid mixtures (GFA) may contain from 5 percent by weight to 25 percent by weight free fatty acids. The glycerides and fatty acid mixtures may comprise one or more component selected from a list of linoleic acid, phytosterols, hydroxycinnamatesteryl esters, lutein, and zeaxanthin. The glyceride and fatty acid mixtures may be extracted from the thin stillage of a dry mill corn ethanol plant or from the distillers grains and solubles of a dry mill corn ethanol plant. The hydroxycinnamate steryl esters concentration may range from 0.3 to 0.5 weight percent. The tocopherols concentration may be less than 150 mg per 100 g of glycerides and fatty acid mixtures. In an embodiment the tocopherols' concentration is 150 mg per 100 g of glycerides and fatty acid mixtures or less.

The fatty glyceride and fatty acid mixtures may be applied as an emulsion. The glycerides and fatty acid mixtures may be combined with collectors and/or frothers. At least a portion (up to 100%) of the glycerides and fatty acid mixtures may be extracted from an ethanol process. The glycerides and fatty acid mixtures may further comprise one or more component selected from a list of linoleic acid, phytosterols, tocopherols, hydroxycinnamatesteryl esters, lutein, zeaxanthin, carotenoids, and any combination thereof. The glyceride and fatty acid mixtures may be extracted from the thin stillage of a dry mill corn ethanol plant or from the distillers grains and solubles of a dry mill corn ethanol plant. The hydroxycinnamate steryl esters concentration may be within the range of 0.3 to 0.5 weight percent. The tocopherols concentration may be less than 150 mg per 100 g of glycerides and fatty acid mixtures Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

For purposes of this application the definition of these terms is as follows:

"Beneficiation" means separating useful matter from waste, particularly hydrophobic substances from hydrophilic substances. Suitable processes for accomplishing this include, but are not limited to, flotation, reverse flotation and similar technologies.

"Glycerides and fatty acid mixtures" means mixtures extracted from an ethanol process comprising both glycerides and fatty acid.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

In at least one embodiment, the invention provides a method of separating a first material from a second material. For example, the method can comprise mixing the first material and the second material within a slurry with a beneficiation composition. The beneficiation composition can comprise one or more glycerides and fatty acid mixtures derived from an ethanol process. Air bubbles can be provided in the slurry to form bubble-particle aggregates with the first material and the bubble-particle aggregates can be allowed to be separated from the second material.

In at least one embodiment, the glycerides and fatty acid mixtures can be generated from an ethanol process. In an ethanol process, the extraction of the glycerides and fatty acid mixtures can be referred to as corn oil extraction. One method of extracting corn oil is through recovery from the stillage and/or the distillers grains and solubles produced by a dry corn ethanol plant. In an embodiment, the glycerides and fatty acid mixtures contains about 5 to 25 weight percent free fatty acids. In another embodiment the GFA contains 5% free fatty acids by weight or greater. Linoleic acid is typically the predominant fatty acid. The glycerides and fatty acid mixtures can contain other components that include phytosterols, hydroxycinnamate steryl esters, lutein, and zeaxanthin.

In at least one embodiment, the glyceride and fatty acid mixtures are extracted from an ethanol process. In an embodiment, the glyceride and fatty acid mixtures contain linoleic acid.

In at least one embodiment a method is provided of separating hydrophobic and hydrophilic particles in an aqueous slurry. For example, the method can comprise adding a beneficiation composition to the aqueous slurry to increase the hydrophobicity of the hydrophobic particles. The beneficiation composition can comprise glycerides and fatty acid mixtures. The aqueous slurry can be mixed to assist the glycerides and fatty acid mixtures to adsorb onto the surface of the hydrophobic particles so as to increase the hydrophobicity of the hydrophobic particles. Air bubbles can be provided to the aqueous slurry so that the hydrophobic particles collect on the surface of the air bubbles forming bubble-particle aggregates. The bubble-particle aggregates can be allowed to float to the surface of the aqueous slurry to be separated from the hydrophilic particles.

In at least one embodiment, the beneficiation composition comprises one or more glycerides and fatty acid mixtures derived from an ethanol manufacturing process. In an embodiment the ethanol process is a fuel ethanol process. In an embodiment the ethanol process is a food or beverage ethanol process.

An advantage of the present invention is to provide cost-effective methods of separating two or more materials.

Another advantage of the present invention is to provide hydrophobicity enhancing compositions that can be used in flotation processes that have improved cost-savings.

In at least one embodiment, the beneficiation composition comprises glycerides and fatty acid mixtures. The glycerides and fatty acid mixtures can comprise linoleic acids and one or more components selected from a list comprising of phytosterols, tocopherols, hydroxycinnamate steryl esters, lutein, zeaxanthin, and carotenoids.

The glycerides and fatty acid mixtures (GFA) were surprisingly found to be effective as reagents for use in beneficiation technologies such as, for example, flotation processes. In addition, these glycerides and fatty acid mixtures are generally environmentally benign and non-hazardous. The glycerides and fatty acid mixtures are also non-combustible and can provide benefits in applications where there is a "high" flash point requirement. The by-products can be used to supplement or replace conventional hazardous collectors for flotation processes such as diesel fuel thereby reducing the dependency on such environmentally unfriendly material. Diesel fuel is used ubiquitously in the mineral processing industry. A good portion of the spent diesel from the processes is injected underground posing an environmental and human health hazard. The present invention offers an added benefit of not posing any environmental and/or human health hazard if discharged underground.

In at least one embodiment the glycerides and fatty acid mixtures are co-products or by-products of an ethanol process. They are considered green compositions because they are non-hazardous and are derived from natural, renewable resources. These renewable resources include corn.

Algae can be used to produce ethanol. GFA can be derived from algae.

Ethanol can be derived from corn utilizing a dry milling process, where the entire corn kennel is ground into flour, and mixed with water. Enzymes are added to convert the starch to sugar. Yeast is then added to convert the sugar to ethanol. The solution, commonly referred to as wash, meal, beer mash or sour mash, is then distilled separating the ethanol from the remaining portion or stillage, commonly referred to as the whole stillage, thick stillage, or thick slop. The nonfermentable parts are separated. The solids are combined into feed co-product called distillers dried grain with solubles (DDGS). The liquid portion, which can contain some solids, is referred to as the thin stillage. Glyceride and fatty acid mixtures can be extracted from the thin stillage and/or the DDGS. The GFA can be referred to as "post fermentation corn oil".

US Published Patent Application 2009/0008301, discloses using hydrophobicity enhancing reagents employing naturally occurring lipids and that triacylglycerols can be readily hydrolyzed to fatty acids. Because vegetable oils are produced by solvent extraction; some of the impurities in the crude oil, such as free fatty acids and phospholipids, are removed from crude vegetable oils by alkali refining and precipitation. US Published Patent Application 2009/0008301 does not teach GFA generated from an ethanol process.

The present invention differs from the commercial vegetable oils. The commercial vegetable oils are refined, bleached and deodorized (RBD). Generally, RBD commercial corn oil contains zero free fatty acids. As a result, the prior art teaches away any intent to utilize the glycerides and fatty acid mixtures derived from an ethanol process.

U.S. Pat. Nos. 7,497,955 and 7,566,469 and U.S. patent application Ser. No. 12/949,850 disclose methods of dewatering thin stillage from an ethanol process utilizing polymers. GFA can be extracted from different phases of the ethanol process. Various methods are disclosed for improving the capture efficiency of the oil from several streams of the ethanol process such as the dry milling process of making both food and fuel grade ethanol from corn. In at least one embodiment, in an ethanol process, ethanol is retrieved from the beer mash in a stripper column and the remaining corn stillage solids are dewatered and a rich supply of glycerides and fatty acid mixtures are recovered from the corn stillage solids.

In at least one embodiment, glycerides and fatty acid mixtures are derived as a by-product from an ethanol process. As described in a published article—"*The Composition of Crude*

Corn Oil Recovered after Fermentation via Centrifugation from a Commercial Dry Grind Ethanol Process", *Journal of the American Oil Chemists Society*, Vol. 87 pp. 895-902, by Robert Moreau, Kevin Hicks, David Johnston, and Nathan Laun, Jul. 26, 2010, the composition of these by-products are quite different from commercial corn oil and unrefined corn oil, and as a result, the GFA marked effectiveness is unexpected. For example, the levels of free fatty acids in the post fermentation corn oil are higher than in the RBD oil or unrefined oil. The levels of free sterols and hydroxycinnamate steryl esters in the GFA are also higher than in commercial oil. Levels of hydroxycinnamate steryl esters in the GFA ranged about 0.3 to 0.5 weight percent, while levels of hydroxycinnamate in commercial corn oil was non-detected. Moreover, the carotenoids levels are much higher in the GFA at concentrations above 250 micrograms per gram of GFA. In an embodiment, the carotenoids level is 250 micrograms per gram of GFA, or greater.

Moreover, because of the exposure to all upstream processes of a fuel ethanol plant, including high-temperature liquefaction, saccharification, and fermentation, the byproducts have lowered levels of tocopherols. Tocopherols in commercial vegetable oil that is unrefined were reported to be about 319 mg per 100 g of oil. Tocopherols in the present invention averaged about 100 mg per 100 g of oil.

Recent federal ruling mandates that 15 billion gallons of corn based ethanol are to be used in commerce by 2022. EPA recognized extraction of the glycerides and fatty acid stream from a fuel ethanol processes is beneficial in terms of ethanol process improvements and lowering greenhouse gas emissions from a holistic ethanol life cycle perspective. One benefit is utilizing the glycerides and fatty acid mixtures as a feedstock to make biodiesel. It is estimated that 0.5 pound to 1.4 pound of glycerides and fatty acid mixtures can be derived from a bushel of corn used for ethanol production.

In at least one embodiment, the invention provides methods of enhancing the hydrophobicity of compounds in certain beneficiation processes. For example, the beneficiation compositions comprising the glycerides and fatty acid mixtures can be useful in beneficiation of the following materials including, but not limited to, the group of coal, plastics, sand and gravel, phosphates, diamonds, and other mineral ores or man-made matter. In alternative embodiments, the beneficiation compositions can be used in processes to increase the hydrophobicity of particulate materials, particularly in applications such as flotation resulting in the beneficiation of coal, phosphates, diamond ore, and the like. The beneficiation compositions can also be used in conjunction with other suitable flotation collectors and promoters.

Flotation processes are one of the most widely used methods of separating the valuable material from valueless material present, for example, in particulates or fines. For example, in this process, the fine particles are dispersed in water or other suitable solution and small air bubbles are introduced to the slurry so that hydrophobic particles can be selectively collected on the surface of the air bubbles and exit the slurry (e.g. by rising to the surface) while hydrophilic particles are left behind. The hydrophilic particles can also sink to the bottom of the slurry to be collected as a sludge.

The glycerides and fatty acid mixtures can be used to separate materials, for example, in any suitable flotation process. It should be appreciated that the desired final products can rise to the surface during flotation and/or sink to the bottom, such as in reverse flotation processes. For example, during silica flotation processes, the desired product can sink to the bottom of the slurry and the waste product can rise to the top of the slurry.

In at least one embodiment, the method includes separating a first material from a second material. For example, the method can comprise mixing the first material and the second material in a slurry with a beneficiation composition. The first material can be water; the second material is being dewatered. The dewatering composition can comprise one or more glycerides and fatty acid mixtures.

In at least one embodiment the glycerides and fatty acid mixtures is applied as an emulsion. Emulsions of the glyceride and fatty acid mixtures can help to disperse the mixtures, obtaining similar performance at less active concentration. The emulsion can contain an emulsion stabilizing reagent.

The materials to be separated can have any suitable size. By example and in no way limiting the inventive concept, the materials can range from 2 mm to 0.1 mm in size. The slurry can also have up to 50% solids. Any suitable mechanical or chemical forces can be used to bring the slurry particles in contact with the beneficiation compositions of the present invention. The floated product and the non-floated tailings can be collected by any suitable means currently known in the art.

EXAMPLES

The foregoing may be better understood by reference to the following examples, which are presented for purposes of illustration and are not intended to limit the scope of the invention.

Example 1

A sample of coal slurry taken from a customer location was floated in the laboratory using a Denver flotation machine. The tests were designed to determine the utility of the glycerides and fatty acid mixtures as standalone collectors. The coal feed slurry was fed into the flotation cell; consequently, separating into two streams the concentrate and the tail. Three sets of samples were run. Five concentrate samples and one tail samples were collected for each set. The % ash and % yield are listed in Table 1 for individual samples as well as for cumulative samples. The cumulative samples' percent ash and percent yield combine the individual samples' percent ash and percent yield. The ash represents the non-useable portion of the coal slurry; the concentrate or percent yield contains the useable portion of the slurry. The glycerides and fatty acid mixture was tested against diesel fuel, a common collector. In some cases it is typical to add a frother in the process to promote bubble formation enhancing the bubble-particle aggregates. In example 1, the frother used was a mixture of alcohols containing methyl isobutyl carbinol. The dosages of the collector and frother are listed in Table 1.

The % ash and the % yield were compared using diesel versus the glycerides and fatty acid mixtures. The concentrate % yields were comparable for both the diesel and the glycerides and fatty acid mixtures for all three sets of data. Similarly the % ash matches closely using between the two collectors. The results indicate the glycerides and fatty acid mixtures is as effective as diesel under the same conditions. The average feed ash (%) was 43%.

TABLE 1

Comparison of Collector Performance of Diesel Fuel versus Glyceride and Fatty acid mixtures (New Chemical as Collector).

| | Diesel as Collector | | | | | | New Chemical as Collector | | | | | Collector | Frother |
|---|---|---|---|---|---|---|---|---|---|---|---|---|---|
| | Ash (%) | | | Yield (%) | | | Ash (%) | | | Yield (%) | | Dosage (g/t) | Dosage (g/t) |
| | Ind. | Cum. | Weight | Ind. | Cum. | | Ind. | Cum. | Weight | Ind. | Cum. | | |
| T1C1 | 11.3 | 11.3 | 34.7 | 17.7 | 17.7 | T7C1 | 12.8 | 12.8 | 42.7 | 20.7 | 20.7 | 50 g/t | 75 g/t |
| T1C2 | 15.2 | 13.1 | 31.0 | 15.9 | 33.6 | T7C2 | 17.0 | 14.6 | 31.4 | 15.2 | 35.9 | | |
| T1C3 | 22.5 | 15.0 | 16.9 | 8.6 | 42.2 | T7C3 | 24.3 | 16.2 | 15.2 | 7.4 | 43.3 | | |
| T1C4 | 24.9 | 16.4 | 12.8 | 6.5 | 48.8 | T7C4 | 33.0 | 18.2 | 11.9 | 5.8 | 49.1 | | |
| T1C5 | 29.3 | 17.6 | 9.9 | 5.0 | 53.8 | T7C5 | 32.0 | 19.6 | 11.9 | 5.8 | 54.8 | | |
| T1T | 72.1 | 42.7 | 90.2 | 46.2 | 100.0 | T7T | 72.6 | 43.6 | 93.2 | 45.2 | 100.0 | | |
| | | | 195.4 | 100.0 | | | | | 206.3 | 100.0 | | | |
| T2C1 | 12.1 | 12.1 | 37.8 | 20.0 | 20.0 | T8C1 | 12.5 | 12.5 | 41.0 | 22.0 | 22.0 | 100 g/t | 75 g/t |
| T2C2 | 14.4 | 13.0 | 23.9 | 12.6 | 32.7 | T8C2 | 16.0 | 13.9 | 27.0 | 14.5 | 36.5 | | |
| T2C3 | 19.6 | 14.6 | 20.2 | 10.7 | 43.4 | T8C3 | 23.6 | 15.6 | 14.4 | 7.7 | 44.2 | | |
| T2C4 | 27.8 | 16.4 | 12.6 | 6.7 | 50.1 | T8C4 | 31.9 | 17.9 | 13.8 | 7.4 | 51.6 | | |
| T2C5 | 32.9 | 17.9 | 9.6 | 5.1 | 55.1 | T8C5 | 32.4 | 19.2 | 8.7 | 4.7 | 56.3 | | |
| T2T | 74.2 | 43.1 | 84.7 | 44.9 | 100.0 | T8T | 73.3 | 42.8 | 81.5 | 43.7 | 100.0 | | |
| | | | 188.7 | 100.0 | | | | | 186.4 | 100.0 | | | |
| T3C1 | 12.7 | 12.7 | 48.4 | 24.0 | 24.0 | T9C1 | 13.2 | 13.2 | 50.2 | 25.4 | 25.4 | 150 g/t | 75 g/t |
| T3C2 | 16.0 | 14.0 | 30.4 | 15.1 | 39.1 | T9C2 | 17.6 | 14.8 | 29.9 | 15.1 | 40.6 | | |
| T3C3 | 22.7 | 15.5 | 17.4 | 8.6 | 47.7 | T9C3 | 26.2 | 16.5 | 14.0 | 7.1 | 47.7 | | |
| T3C4 | 35.2 | 17.8 | 12.8 | 6.3 | 54.1 | T9C4 | 33.7 | 18.4 | 11.8 | 6.0 | 53.6 | | |
| T3C5 | 39.6 | 19.5 | 8.9 | 4.4 | 58.5 | T9C5 | 33.5 | 19.5 | 8.4 | 4.3 | 57.9 | | |
| T3T | 72.5 | 41.5 | 83.8 | 41.5 | 100.0 | T9T | 72.6 | 41.9 | 83.1 | 42.1 | 100.0 | | |
| | | | 201.8 | 100.0 | | | | | 197.4 | 100.0 | | | |

Examples 2 and 3

The flotation tests were conducted in a 1.5 L Denver flotation machine to demonstrate that GFA (glycerides and fatty acid mixture) can be applied for coal flotation. Both hard-to-float and easy-to-float coal samples were used for the tests. GFA was used as collector either in oily or in emulsions. The GFA emulsions were made with mechanical agitation by adding emulsifiers (soy lecithin and Tween 81) and frother. The following formulations are typical GFA emulsions:

Emulsion A: 36% GFA, 10% frother, 2% soy lecithin, 2% Tween 81 and 50% water

Emulsion B: 26% GFA, 10% #2 diesel, 10% frother, 2% soy lecithin, 2% Tween 81 and 50% water Emulsion C: 46% GFA, 10% frother, 2% soy lecithin, 2% Tween 81 and 40% water Emulsion D: 33% GFA, 13% #2 diesel, 10% frother, 2% soy lecithin, 2% Tween 81 and 40% water In Examples 2 and 3, recovery data is listed. Recovery is defined as the percent of the valuable mineral in the feed reporting into the concentrate.

Example 2

Shown in Table 2 are the results obtained with an easy-to-float coal slurry sample. GFA and its emulsions were used as collectors under various dosages. Without collector, the flotation recovery achieved 86%. This indicated that this coal is easy-to-float. With addition of #2 diesel fuel, the maximum flotation recovery achieved was 88%. With addition of GFA and emulsions A, B, C, D, the maximum flotation recovery reached 90-91%. These results implied that GFA and its emulsions behaved stronger over #2 diesel as collector for easy-to-float coal.

TABLE 2

Flotation results with GFA and its emulsions as collectors for the easy-to-float coal sample flotation. Frother dosage is 160 g/t.

| | Collector, | Results, % | | |
|---|---|---|---|---|
| Collector | g/t | Yield | Ash | Recovery |
| No | 0 | 49.77 | 15.76 | 86.45 |
| #2 diesel | 70 | 50.71 | 16.07 | 87.68 |
| #2 diesel | 140 | 51.68 | 17.02 | 87.89 |
| #2 diesel | 210 | 51.97 | 17.32 | 88.41 |
| GFA | 70 | 52.60 | 18.03 | 88.15 |
| GFA | 140 | 53.52 | 18.56 | 89.43 |
| GFA | 210 | 54.93 | 20.12 | 89.94 |
| Emulsion A | 70 | 52.48 | 18.16 | 88.34 |
| Emulsion A | 140 | 54.17 | 19.42 | 89.53 |
| Emulsion A | 280 | 55.14 | 20.13 | 90.32 |
| Emulsion B | 70 | 52.95 | 18.36 | 88.96 |
| Emulsion B | 140 | 53.44 | 18.52 | 89.39 |
| Emulsion B | 280 | 55.99 | 20.73 | 90.91 |
| Emulsion C | 70 | 54.28 | 19.62 | 90.13 |
| Emulsion C | 140 | 55.66 | 20.93 | 90.22 |
| Emulsion C | 280 | 57.04 | 21.72 | 91.34 |
| Emulsion D | 70 | 54.61 | 20.12 | 89.89 |
| Emulsion D | 140 | 56.05 | 20.47 | 90.82 |
| Emulsion D | 280 | 56.22 | 21.29 | 91.27 |

Example 3

Shown in Table 3 are the results obtained with a hard-to-float coal slurry sample. GFA and its emulsions were used as collectors under various dosages. Without collector, the flotation recovery achieved only 13%. This indicated that this coal is hard-to-float. With addition of #2 diesel fuel, the maximum flotation recovery achieved was 70%. With addition of GFA and emulsions B, C, D, the maximum flotation recovery reached 80%. These results implied that GFA and its emulsions are more effective than #2 diesel as collector for hard-to-float coal.

TABLE 3

Flotation results with GFA and its emulsions as collectors for the hard-to-float coal sample. Frother dosage is 300 g/t.

| Collector | Collector, g/t | Results, % | | |
|---|---|---|---|---|
| | | Yield | Ash | Recovery |
| none | 0 | 8.91 | 9.01 | 13.40 |
| #2 diesel | 140 | 33.92 | 10.90 | 49.72 |
| #2 diesel | 280 | 40.52 | 12.12 | 58.72 |
| #2 diesel | 420 | 41.16 | 12.54 | 59.59 |
| GFA | 140 | 42.13 | 12.12 | 61.58 |
| GFA | 280 | 47.11 | 13.51 | 67.51 |
| GFA | 420 | 48.14 | 14.30 | 68.34 |
| Emulsion B | 140 | 43.56 | 13.20 | 62.66 |
| Emulsion B | 280 | 44.62 | 13.77 | 64.01 |
| Emulsion B | 560 | 50.30 | 15.15 | 70.42 |
| Emulsion C | 140 | 43.56 | 13.83 | 62.11 |
| Emulsion C | 280 | 46.26 | 14.37 | 65.29 |
| Emulsion C | 560 | 49.52 | 15.27 | 69.63 |
| Emulsion D | 140 | 44.81 | 13.68 | 64.14 |
| Emulsion D | 280 | 48.74 | 14.27 | 69.21 |
| Emulsion D | 560 | 48.59 | 14.88 | 69.37 |

While this invention may be embodied in many different forms described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of separating a first material from a second material, the method comprising the steps of:
    mixing the first material and the second material in a slurry with a beneficiation composition, providing air bubbles in the slurry to form bubble-particle aggregates with the first material, and allowing the bubble-particle aggregates to be separated from the second material;
    wherein the beneficiation composition comprises an extract, the extract having been extracted from an ethanol process and comprises a mixture of a fatty acid and at least one glyceride,
    the composition further comprises carotenoids in a concentration of at least 250 micrograms per gram of the sum of grams of glycerides plus grams of fatty acid, and optionally the composition further comprises one or more component selected from the list consisting of: linoleic acid, phytosterols, tocopherols, hydroxycinnamate steryl esters, lutein, and zeaxanthin, and any combination thereof.

2. The method of claim 1, wherein the composition comprises at least 5 percent by weight of free fatty acids.

3. The method of claim 1, wherein the composition comprises one or more components selected from the list consisting of: linoleic acid, phytosterols, tocopherols, hydroxycinnamate steryl esters, lutein, and zeaxanthin.

4. The method of claim 1, wherein the extract was extracted from the thin stillage of a dry mill corn ethanol plant or from the distillers grains and solubles of a dry mill corn ethanol plant.

5. The method of claim 1, wherein the composition further comprises tocopherols in a concentration of no more than 150 mg per 100 g of the sum of glycerides and fatty acid mixtures.

6. The method of claim 1, wherein the carotenoids' concentration is more than 400 microgram per gram of the sum of glycerides and fatty acid mixtures.

7. The method of claim 1, wherein the extract is applied as an emulsion.

8. The method of claim 7, wherein the extract is combined with one or more of collectors and frothers.

9. A method of separating a first material from a second material, the method comprising the steps of:
    mixing the first material and the second material in a slurry with a beneficiation composition, providing air bubbles in the slurry to form bubble-particle aggregates with the first material, and allowing the bubble-particle aggregates to be separated from the second material;
    wherein the beneficiation composition comprises an extract, the extract having been extracted from an ethanol process and comprises a mixture of a fatty acid and at least one glyceride, and the composition further comprises carotenoids.

* * * * *